(12) United States Patent
Suzuki

(10) Patent No.: US 8,505,889 B2
(45) Date of Patent: Aug. 13, 2013

(54) VIBRATION-ISOLATING BUSH

(75) Inventor: Ken Suzuki, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 670 days.

(21) Appl. No.: 11/915,820

(22) PCT Filed: Jan. 22, 2007

(86) PCT No.: PCT/JP2007/050912
§ 371 (c)(1),
(2), (4) Date: Sep. 9, 2008

(87) PCT Pub. No.: WO2008/090594
PCT Pub. Date: Jul. 31, 2008

(65) Prior Publication Data
US 2009/0289399 A1 Nov. 26, 2009

(51) Int. Cl.
*B60G 11/22* (2006.01)
*F16F 1/40* (2006.01)

(52) U.S. Cl.
USPC .................................. 267/293; 267/141.1

(58) Field of Classification Search
USPC .......... 267/141.1, 141.2, 141.3, 141.4, 141.7, 267/152, 258, 293, 294; 29/898.054, 898.055; 384/222, 231, 276; 248/560, 609, 635
See application file for complete search history.

(56) References Cited

U.S. PATENT DOCUMENTS

| | | | | |
|---|---|---|---|---|
| 4,105,266 A | * | 8/1978 | Finney | 384/221 |
| RE30,262 E | * | 4/1980 | Schmidt | 267/152 |
| 5,887,859 A | * | 3/1999 | Hadano et al. | 267/141.1 |
| 6,572,088 B2 | * | 6/2003 | Tadano et al. | 267/141.3 |
| 2002/0060385 A1 | * | 5/2002 | Mayerbock et al. | 267/293 |
| 2003/0020223 A1 | | 1/2003 | Kameda | |
| 2005/0153781 A1 | * | 7/2005 | Buhl et al. | 464/89 |

FOREIGN PATENT DOCUMENTS

| | | |
|---|---|---|
| DE | 102 29 753 A1 | 1/2004 |
| FR | 2695972 A1 | 3/1994 |
| JP | 241736 U | 3/1990 |
| JP | 312029 U | 2/1991 |

(Continued)

OTHER PUBLICATIONS

International Search Report of PCT/JP2007/050912, date of mailing Mar. 6, 2007.

(Continued)

*Primary Examiner* — Melody Burch
(74) *Attorney, Agent, or Firm* — Westerman, Hattori, Daniels & Adrian, LLP

(57) ABSTRACT

An intermediate cylinder 18 is interposed between an inner cylinder 12 and an outer cylinder 14. The inner cylinder has a first bulging portion 20 of a spherical zone shape. The intermediate cylinder has a second bulging portion 22 of a spherical zone shape enclosing the first bulging portion. The inner circumference of the second bulging portion has a first spherical recess 23 corresponding to the first bulging portion. The inner circumference portion of the outer cylinder 14 enclosing the second bulging portion has a second spherical recess 25 corresponding to the second bulging portion. A rubbery elastic member 16 has an inner elastic portion 26 connecting the inner cylinder 12 and the intermediate cylinder 18 and an outer elastic portion 28 connecting the intermediate cylinder 18 and the outer cylinder 14. The axial size D1 of the inner elastic portion is larger than the axial size D2 of the outer elastic portion.

8 Claims, 9 Drawing Sheets

(56) References Cited

FOREIGN PATENT DOCUMENTS

| | | |
|---|---|---|
| JP | 676730 U | 10/1994 |
| JP | 9100859 A | 4/1997 |
| JP | 9100861 A | 4/1997 |
| JP | 2001-317578 A | 11/2001 |
| JP | 2002-276711 A | 9/2002 |
| JP | 2003106359 A | 4/2003 |
| JP | 2003226239 A | 8/2003 |
| JP | 2003294084 A * | 10/2003 |
| JP | 2005112258 A | 4/2005 |
| WO | 9531652 A1 | 11/1995 |

OTHER PUBLICATIONS

Japanese Office Action dated Nov. 25, 2008, issued in corresponding Japanese Patent Application No. 2007-006377. (w/partial English translation).

* cited by examiner

VIBRATION-ISOLATING BUSH

TECHNICAL FIELD

The present invention relates to a vibration-isolating bush to be assembled for use in the suspension mechanism of an automobile and so on.

BACKGROUND ART

In the prior art, the automotive suspension mechanism uses the vibration-isolating bush at a portion connecting the car body and the suspension with a view to attenuating and absorbing the shocks. This vibration-isolating bush is generally provided with a shaft member such as an inner cylinder, an outer cylinder arranged at a spacing outside of the shaft member, and a rubbery elastic member interposed between the shaft member and the outer cylinder to bind the two elastically.

As the suspension mechanism having the vibration-isolating bush of this kind, a multi-link type rear suspension mechanism, as shown in FIG. 15 and FIG. 16, is disclosed in the following Patent Document 1. This suspension mechanism is provided with: an axle 62 for supporting a wheel 60 rotatably; a pair of front and rear upper links 64 and 66 connected at their one-end portions 64a and 66a rockably to an axle 62 and connected at their other-end portions 64b and 66b rockably to a suspension member 68 acting as a body side member; a pair of front and rear lower links 70 and 72 connected at their one-end portions 70a and 72a rockably to the axle 62 and connected at their other-end portions 70b and 72b rockably to the suspension member 68; and a toe control link 74 connected at its one-end portion 74a rockably to the axle 62 and connected at its other-end portion 74b rockably to the suspension member 68. Here, letter F designates the front side of the car body, and letter H designates the width direction of the car body.

Moreover, the other-end portions 64b, 66b, 70b, 72b and 74b of the individual links 64, 66, 70, 72 and 74 and the suspension member 68 are connected through vibration-insulating bushes 76, 78, 80, 82 and 84, respectively, and the individual vibration-isolating bushes have their axes p1, p2, p3, p4 and p5 arranged to along the directions perpendicular to the longitudinal directions r1, r2, r3, r4 and r5 of the individual links.

In the multi-link type suspension mechanism thus far described, as shown in FIG. 16, the individual links 64, 66, 70, 72 and 74 are set at inclined positions in a top plan view. Specifically, the lower link 70 on the front side is set in a top plan view to the inclined position, at which the inner side of the body width direction H is positioned on the body front side F. The lower link 72 on the rear side is set in a top plan view to the inclined position, at which the outer side of the body width direction H is positioned on the body front side F. The toe control link 74 is set in a top plan view to the inclined position, at which the outer side of the body width direction H is positioned on the body front side F.

While the vehicle is running, therefore, forces of various directions are inputted to the vibration-isolating bushes 80, 82 and 84, which are coupled mainly to the lower links 70 and 72 and the toe control link 74. If the suspension mechanism is vertically displaced with respect to the car body, for example, not only the forces in a twisting direction N (as referred to FIG. 2) but also the forces in a prying direction Z (as referred to FIG. 1) are applied to the vibration-isolating bushes 80, 82 and 84. If the suspension mechanism is transversely displaced with respect to the car body, on the other hand, not only the forces in a transverse direction Y (as referred to FIG. 1) but also the forces in an axial direction X (as referred to FIG. 1) are applied to the vibration-isolating bushes 80, 82 and 84.

In order to improve the riding comfortableness and the steering stability in the vibration-isolating bush of this kind, therefore, it is desired to reduce the spring constants in the twisting direction and in the prying direction while enlarging the spring constants in the transverse direction and in the axial direction.

For this desire, there has been developed the so-called "vibration-isolating bush of a bulge type" (as referred to the following Patent Document 2), in which the inner cylinder is provided at its axially central portion with a bulging portion bulging in the transverse direction so as to reduce the spring constant in the prying direction while enlarging the spring constant in the transverse direction. In order to enhance the spring constant more in the transverse direction, moreover, there is disclosed in the following Patent Document 3 a vibration-isolating bush of the aforementioned bulge type, which is constituted to have an intermediate cylinder between an inner cylinder and an outer cylinder.

Patent Document 1: JP-A-2005-112258,
Patent Document 2: JP-A-09-100859, and
Patent Document 3: JP-A-09-100861.

DISCLOSURE OF THE INVENTION

Problems to be Solved by the Invention

In the vibration-isolating bush disclosed in the aforementioned Patent Document 3, the inner cylinder is provided with a bulging portion of a spherical zone shape, and the intermediate cylinder is also provided with the bulging portion corresponding to the former bulging portion. The intermediate cylinder is provided, respectively on the inner and outer rubbery elastic members, with hollow portions having their leading ends leading to the bulging portions, so that the rigidity in the prying direction is lowered while enhancing the rigidity in the transverse direction.

In the vibration-isolating bush disclosed in that Patent Document, however, the following problem arises because the aforementioned inner and outer rubbery elastic members have the identical axial sizes. Specifically, the vibration-isolating mechanism of this kind is subjected at its outer cylinder, after the rubbery elastic members were vulcanized, to a drawing work so as to eliminate the molding distortion. In the vibration-isolating bush having the intermediate cylinder, however, the rubbery elastic member outside of the intermediate cylinder is compressed, but the intermediate cylinder is hardly reduced in its diameter, so that the rubbery elastic member on the inner side of the intermediate cylinder is not compressed. In the outer rubbery elastic member, therefore, the spring constant in the transverse direction is made higher by the compression than that of the inner rubbery elastic member. With the spring constants of the rubbery elastic members being thus made different between the outer side and the inner side, the spring characteristics are made so nonlinear by the inner rubbery elastic member having the lower spring constant, when the load is inputted in the transverse direction to the vibration-isolating bush, that the load-deflection curve gently rises at an initial stage and then grows steep. Thus, it is impossible to acquire excellent vibration-isolating characteristics.

In the vibration-isolating bush disclosed in that Patent Document, moreover, the outer cylinder is not provided on its inner circumference with a spherical recess corresponding to the bulging portion of the intermediate cylinder, and the aforementioned hollow portions reach the bulging portion. At the time of drawing the outer cylinder, therefore, it is thought that the rubber cannot be compressed homogeneously in the axial direction thereby to deteriorate the durability.

The present invention has been conceived in view of the points thus far described, and has an object to provide a vibration-isolating bush, which can reduce the spring constants in the twisting direction and in the prying direction while retaining the spring constants in the transverse direction and in the axial direction, and which can bring the spring characteristics closer to the linearity against the load input in the transverse direction.

Means for Solving the Problems

According to the invention, there is provided a vibration-isolating bush comprising: a shaft member, an outer cylinder for enclosing the shaft member axially in parallel; and a rubbery elastic member interposed between the shaft member and the outer cylinder. The vibration-isolating bush is constituted:

by comprising an intermediate cylinder interposed between the shaft member and the outer cylinder for enclosing the shaft member axially in parallel;

such that the shaft member has its axially central portion formed into a first bulging portion of a spherical zone shape bulging transversely outward, such that the intermediate cylinder enclosing the first bulging portion has its axially central portion formed into a second bulging portion of a spherical zone shape bulging transversely outward, such that the second bulging portion has its inner circumference formed into a first spherical recess corresponding to the first spherical bulge of the first bulging portion, and such that the inner circumference portion of the outer cylinder enclosing the second bulging portion is formed into a second spherical recess corresponding to the second spherical bulge of the outer circumference of the second bulging portion; and such that the rubbery elastic member includes an inner elastic portion adhered individually to the outer circumference of the shaft member containing the first spherical bulge and the inner circumference of the intermediate cylinder containing the first spherical recess, thereby to connect the shaft member and the intermediate cylinder, and an outer elastic portion adhered individually to the outer circumference of the intermediate cylinder containing the second spherical bulge and the inner circumference of the outer cylinder containing the second spherical recess, thereby to connect the intermediate cylinder and the outer cylinder, and such that the inner elastic portion is formed to have a larger axial size than that of the outer elastic portion.

In the aforementioned constitution, the outer cylinder can be drawn after the rubbery elastic member was vulcanized, and the outer elastic portion may then be made thicker, before drawn, in the transverse direction than the inner elastic portion, and may be made as thick as the inner elastic portion by the drawing work.

Moreover, the two end portions of the inner elastic portion may be extended so axially outward as to connect the shaft member portion on the axially outer side of the first spherical bulge and the intermediate cylinder portion on the axially outer side of the first spherical recess, and the two end portions of the outer elastic portion may be extended so axially outward as to connect the intermediate cylinder portion on the axially outer side of the second spherical bulge and the outer cylinder portion on the axially outer side of the second spherical recess.

Moreover, it is preferred that the outer cylinder is formed into a straight cylinder shape having an outer circumference of a constant diameter in the axial direction.

Moreover, the shaft member may be made of an inner cylinder of a cylindrical shape, and the inner cylinder may have its at least one axial end portion radially enlarged by a cold-plastic work after the rubbery elastic member was vulcanized.

Moreover, stopper rubber portions may be disposed at the axially end portions of the outer cylinder.

Advantage of the Invention

In the vibration-isolating bush of the invention, at the time of displacement in the prying direction, the shearing deformations are received mainly by the inner elastic portion between the first spherical bulge of the shaft member and the first spherical recess of the intermediate cylinder, and by the outer elastic portion between the second spherical bulge of the intermediate cylinder and the second spherical recess of the outer cylinder so that the spring constant in the prying direction can be effectively reduced. Against the displacement in the axial direction, on the other hand, the rubbery elastic member receives not only the shearing deformation but also the compressive deformation between each spherical bulge and each spherical recess so that the spring constant in the axial direction can be raised.

Moreover, the intermediate cylinder can increase the spring constant in the transverse direction. In case the spring constant in the transverse direction is set equivalent to that of the case of no intermediate cylinder, the rubbery elastic member to be used can be made softer thereby to lower the spring constant in the twisting direction.

Moreover, the outer elastic portion on the outer side of the intermediate cylinder is compressed to have a higher spring constant by drawing the outer cylinder. However, the axial size of the inner elastic portion, as left uncompressed by the drawing work, is set so large that the rise in the spring constant of the outer elastic portion by the drawing work can be compensated. As a result, it is possible to bring the spring constant closer to the linearity against the load input in the transverse direction.

BEST MODE FOR CARRYING OUT THE INVENTION

Embodiments of the invention are described in the following with reference to the accompanying drawings.

A vibration-isolating bush 10 according to a first embodiment is used in the aforementioned multi-link type suspension mechanism shown in FIG. 15 and FIG. 16. More specifically, the vibration-isolating bush 10 is used as a vibration-isolating bush 80 for connecting the other-end portion 70b of a lower link 70 on the front side and a suspension member 68, a vibration-isolating bush 82 for connecting the other-end portion 72b of a lower link 72 on the rear side and the suspension member 68, and a vibration-isolating bush 84 for connecting the other-end portion 74b of a toe control link 74 and the suspension member 68. A description of the entire constitution of the suspension mechanism is omitted, because it has been described hereinbefore.

The vibration-isolating bush 10 is provided, as shown in FIGS. 1 and 2, with an inner cylinder 12 acting as a shaft member, an outer cylinder 14 axially in parallel with and coaxially enclosing the inner cylinder 12, a cylindrical rubbery elastic member 16 interposed between the inner cylinder 12 and the outer cylinder 14, and an intermediate cylinder 18 enclosing the inner cylinder 12 axially in parallel and coaxially therewith at an intermediate position between the inner cylinder 12 and the outer cylinder 14. As shown in FIG. 10, the inner cylinder 12 is so fixed on a bracket 1 of the suspension member by fastening it with not-shown fastening members such as bolts that its two end faces are clamped by the bracket 1. Moreover, the outer cylinder 14 is fixed by press-fitting it into a cylindrical holder 3 of the lower link 70 or the like. As a result, the vibration-isolating bush 10 connects the lower link 70 or the like and the bracket 1 on the suspension member side in a vibration isolating manner.

The inner cylinder 12 is a cylindrical member made of a metal, and is provided, at a central portion in an axial direction X, as shown in FIGS. 4 and 5, with a first bulging portion 20 of a spherical zone shape bulging all over the circumference in a transversely outward direction Y1. The outer circumference of the first bulging portion 20 is formed into a spherical bulge 21 (as will be called the "first spherical bulge"). Specifically, the first spherical bulge 21 has such a spherical zone shape as forms an axially central portion of a sphere having a center P on the axis A of the inner cylinder 12 and as gently continues from the outer circumferences 12A of the generally cylindrical portions (i.e., straight cylinder portions having a constant external diameter) at the two axially end portions of the inner cylinder 12.

The intermediate cylinder 18 is a cylindrical member made of a metal thinner than the inner cylinder 12 and the outer cylinder 14, and as shown in FIGS. 1, 8 and 9, its central portion, as enclosing the first bulging portion 20, in the axial direction X is bent into a second bulging portion 22 of a spherical zone shape bulging all over its circumference in the transversely outward direction Y1. The inner circumference of the second bulging portion 22 is formed into a spherical recess 23 (as will be called the "first spherical recess") concentric to (i.e., having the common center P) the first spherical bulge 21 of the first bulging portion 20. The outer circumference of the second bulging portion 22 is formed into a spherical bulge 24 (as will be called the "second spherical bulge") concentric to the first spherical bulge 21 of the first bulging portion 20. The first spherical recess 23 is formed to gently continue from the inner circumferences 18A of the generally cylindrical portions (i.e., straight cylinder portions having constant internal and external diameters) at the two axially end portions of the intermediate cylinder 18. The second spherical bulge 24 is formed to gently continue from the outer circumferences 18B of the aforementioned generally cylindrical portions.

The outer cylinder 14 is a cylindrical member made of a metal, and is formed into a straight cylinder shape having an exterior shape of a circular section and an outer circumference 14A of a diameter constant in the axial direction X, as shown in FIGS. 6 and 7. As shown in FIG. 1, the inner circumferential portion of the outer cylinder 14 enclosing the aforementioned second bulging portion 22 is formed into a spherical recess 25 (as will be called the "second spherical recess") concentric to the second spherical bulge 24 on the outer circumference side of the second bulging portion 22. In the shape after a later-described drawing work, more specifically, an inner circumference 14B at the central portion of the outer cylinder 14 is recessed along and at a constant spacing from the aforementioned second spherical bulge 24, into the spherical recess 25 recessed toward the transversely outward direction Y1. The second spherical recess 25 is formed into the spherical zone shape forming the central portion of the spherical face, and is formed to gently continue from the inner circumferences 14B of the general cylinder portion (i.e., the straight cylindrical portions having a constant internal diameter) in the two axial end portions of the outer cylinder 12.

Since this second spherical recess 25 is formed, the outer cylinder 14 is formed thinner at its axially central portion than at its two end portions. In the state before the drawing work, as shown in FIG. 7, the second spherical recess 25 is not the spherical zone strictly, but the centers P are deviated in the transverse direction Y (i.e., a direction perpendicular to the axis A) from the axis A of the outer cylinder 14. By the drawing work in the radially reducing directions, the second spherical recess 25 is formed into the spherical zone shape, in which the center P is positioned on the axis A, as shown in FIG. 1.

As shown in FIG. 1, the rubbery elastic member 16 is constituted to include an inner elastic portion 26 for connecting the inner cylinder 12 and the intermediate cylinder 18, and an outer elastic portion 28 for connecting the intermediate cylinder 18 and the outer cylinder 14. These two elastic portions are made of an identical rubber material, and are connected to each other through a plurality of communication holes 30 formed in the circumferential direction in the second bulging portion 22 of the intermediate cylinder 18.

The inner elastic portion 26 is vulcanized and adhered individually to the outer circumferences 12A of the inner cylinder 12 including the first spherical bulge 21 and to the inner circumferences 18A of the intermediate cylinder 18 including the first spherical recess 23. The outer elastic portion 28 is vulcanized and adhered individually to the outer circumferences 18B of the intermediate cylinder 18 including the second spherical bulge 24 and to the inner circumferences 14B of the outer cylinder 14 including the second spherical recess 25.

The inner elastic portion 26 is not only filled between the first spherical bulge 21 and the first spherical recess 23 but also made to have its two end portions 26A and 26A so extended in an axially outward direction X1 as to connect inner cylinder portions 12B closer in the axially outward direction X1 than the first spherical bulge 21 and intermediate cylinder portions 18C closer in the axially outward direction X1 than the first spherical recess 23. Likewise, the outer elastic portion 28 is not only filled between the second spherical bulge 24 and the second spherical recess 25 but also made to have its two end portions 28A and 28A so extended in the axially outward direction X1 as to connect the intermediate cylinder portions 18C closer in the axially outward direction X1 than the second spherical bulge 24 and outer cylinder portions 14C closer in the axially outward direction X1 than the second spherical recess 25.

Moreover, the elastic portions 26 and 28 are provided at their axial end faces with annular hollow portions 32 and 34, which are depressed in an axially inward direction X2 into arcuate sections. The hollow portion 32 of the inner elastic portion 26 is made shallower in an axial direction X than the hollow portion 34 of the outer elastic portion 28. As a result, the inner elastic portion 26 is formed to have a larger axial size D1 than the axial size D2 of the outer elastic portion 28 (that is, D1>D2).

As to the thicknesses of the two elastic portions 26 and 28 in the transverse direction Y, before the drawing work of the outer cylinder 14 shown in FIG. 3, the outer elastic portion 28 has its thickness E2 set larger than the thickness E1 of the inner elastic portion 26 (that is, E1<E2). After the drawing work shown in FIG. 1, the outer elastic portion 28 is compressed in the transverse direction Y so that the thickness E1 of the inner elastic portion 26 and the thickness E2 of the outer elastic portion 28 are set substantially equal to each other (that is, E1=E2).

When the vibration-isolating bush 10 is to be manufactured, there are separately prepared: the inner cylinder 12 having the first bulging portion 20, as shown in FIGS. 4 and 5; the outer cylinder 14 having the second spherical recess 25 in the inner circumference 14B, as shown in FIGS. 6 and 7; and the intermediate cylinder 18 having the second bulging portion 22, as shown in FIGS. 8 and 9.

Next, the aforementioned inner cylinder 12, outer cylinder 14 and intermediate cylinder 18 are arranged in the not-shown mold, and a rubber material is injected into the mold thereby to vulcanize the rubbery elastic member 16, as composed of the inner elastic portion 26 and the outer elastic portion 28, between the inner cylinder 12 and the outer cylinder 14. As a result, the vulcanized molding, as shown in FIG. 3, before drawn is obtained.

After this, the outer cylinder 14 of the aforementioned vulcanized molding is drawn so that it is radially reduced to produce the vibration-isolating bush 10 shown in FIG. 1. By the drawing work, the outer elastic portion 28 is compressed in the transverse direction Y to have a higher spring constant. On the other hand, the inner elastic portion 26 is left uncompressed in the transverse direction Y, because the intermediate cylinder 18 is not radially reduced in the presence of the outer elastic portion 28. However, the inner elastic portion 26 is set larger in the axial size than the outer elastic portion 28 (D1>D2), so that the rise in the spring constant by the aforementioned drawing work can be compensated to set the spring constant in the transverse direction Y equivalent at the inner elastic portion 26 and the outer elastic portion 28. As a result, the spring characteristics can be made more linear against the load input to the vibration-isolating bush 10 in the transverse direction Y so that the desired vibration-isolating characteristics can be exhibited. By making the inner and outer spring constants equivalent, moreover, it is possible to improve the durability of the vibration-isolating bush 10 against the load input in the transverse direction Y.

With the vibration-isolating bush 10 of this embodiment and at the time of displacement in a prying direction Z, the inner elastic portion 26 between the first spherical bulge 21 of the inner cylinder 12 and the first spherical recess 23 of the intermediate cylinder 18, and the outer elastic portion 28 between the second spherical bulge 24 of the intermediate cylinder 18 and the second spherical recess 25 of the outer cylinder 14 are subjected mainly to shearing deformations. As a result, it is possible to effectively reduce the spring constant in the prying direction Z.

Against the displacement in the axial direction X, on the other hand, the rubbery elastic member 16 is subjected not only the shearing deformation but also the compression deformation between the spherical bulges 21 and 24 and the spherical recesses 23 and 25. As a result, it is possible to raise the spring constant in the axial direction X.

With the intermediate cylinder 18, the spring constant in the transverse direction Y is enlarged. In case, therefore, the spring constant in the transverse direction Y is set equivalent to that of the case having no intermediate cylinder, a softer rubbery elastic member 16 can be used to lower the spring constant in a twisting direction N.

Thus, this vibration-isolating bush 10 can reduce the spring constants effectively in the prying direction Z and in the twisting direction N, while retaining the spring constants in the axial direction X and in the transverse direction Y. As a result, the spring constant in the vertical direction of the suspension mechanism can be effectively reduced while retaining the spring constant high in the horizontal direction of the suspension mechanism, so that the riding comfortableness can be drastically improved while retaining the steering stability.

In this vibration-isolating bush 10, moreover, the axial size D1 of the inner elastic portion 26 is made larger than the axial size D2 of the outer elastic portion 28. As a result, the inner elastic portion 26 of a smaller circumference length can retain the contact area with the inner cylinder 12 accordingly larger thereby to improve the durability.

For the spring constant at the time of displacement in the prying direction Z, on the other hand, the outer elastic portion 28 having the shorter axial size makes a higher contribution. Between the individual spherical bulges 21 and 24 and spherical recesses 23 and 25 made concentric, however, the second spherical bulge 24 and the second spherical recess 25, as connected by the outer elastic portion 28, on the outer circumference side have larger arcuate lengths in the axial section, as shown in FIG. 1, than the first spherical bulge 21 and the first spherical recess 23 on the inner circumference side. At the time of the displacement in the prying direction Z, therefore, the spring constant in the prying direction Z can be reduced by making the shearing deformation more chiefly at the outer elastic portion 28.

In this vibration-isolating bush 10, moreover, the thickness E1 of the inner elastic portion 26 and the thickness E2 of the outer elastic portion 28 are made equivalent after the drawing work. As a result, the spring constant in the transverse direction Y can be made more equivalent between the inner elastic portion 26 and the outer elastic portion 28 so that it can be made closer to the linear spring characteristics.

Moreover, the recessed portion of the inner circumference of the outer cylinder 14 enclosing the second bulging portion 22 of the intermediate cylinder 18 is the second spherical recess 25 of the spherical shape, and the two end portions 28A and 28A of the outer elastic portion 28 are extended to the outer side of the second spherical recess 25. At the time of drawing the outer cylinder 14, therefore, the outer elastic portion 28 can be equivalently compressed in the axial direction X thereby to improve the durability.

In the outer cylinder 14, the outer circumference 14A is formed into the straight cylinder shape having the constant diameter in the axial direction although the inner circumference 14B has the second spherical recess 25. As a result, a sufficient axial size for the press-fit can be retained between the outer cylinder 14 and the cylindrical holder 3 thereby to improve the force to extract the outer cylinder 14 from the cylindrical holder 3.

FIGS. 11 to 13 show a vibration-isolating bush 10A according to a second embodiment. This embodiment is characterized in that the two end portions 12C and 12C of the inner cylinder 12 in the axial direction X are radially enlarged by a cold-plastic working after the rubbery elastic member 16 was vulcanized so that they are formed as radially enlarged portions 36 and 36.

In the second embodiment, more specifically, the rubbery elastic member 16 is vulcanized, as shown in FIG. 11, to prepare the vulcanized molding before the drawing work, and the outer cylinder 14 is then drawn to manufacture the vibration-isolating bush 10A, as shown in FIG. 12. Next, the not-shown pressing jig is caused to press the individual end faces of the two end portions 12C and 12C of the inner cylinder 12 of the vibration-isolating bush 10A in the axial direction X, thereby to form the radially enlarged portions 36, at which the end portions 12C of the inner cylinder 12 are thicker than the axially inner portions. The radial expansion by this cold-plastic working is disclosed in JP-A-2003-106359, for example, and can resort to the method disclosed.

By providing those radially enlarged portions 36, according to the second embodiment, the area of the end faces of the inner cylinder 12 can be enlarged while retaining the free length at the rubbery elastic member 16, especially, at the end portions 26A of the inner elastic portion 26. As a result, the facial pressures on the end faces of the inner cylinder 12 fastened to the bracket 1 can be lowered. The remaining constitutions and advantages are similar to those of the foregoing first embodiment, and therefore, descriptions thereof are omitted.

FIG. 14 shows a vibration-isolating bush 10B according to a third embodiment. This embodiment is characterized in that the outer cylinder 14 is provided at its one axial end portion 14D with a flanged portion 38 extending in the transversely outer direction Y1, and in that the flanged portion 38 is provided on its axially outer side face 38A with a stopper rubber portion 40 for exhibiting a stopper action between itself and the not-shown bracket. On the other hand, the other axial end portion 14E of the outer cylinder 14 is provided to the end faces not with the flanged portion but directly with a stopper rubber portion 42.

The flanged portion 38 is formed in an annular shape around the whole circumference of the axial end portion 14D of the outer cylinder 14, and the stopper rubber portion 40 is also formed in an annular shape around the whole circumference along the flanged portion 38. The stopper rubber portion 42 on the other end side is also formed in an annular shape around the whole circumference of the axial end portion 14E of the outer cylinder 14. The two stopper rubber portions 40 and 42 are integrated of the rubber leading from the aforementioned rubbery elastic member 16.

Thus, the stopper rubber portions 40 and 42 are formed at the two end portions 14D and 14E of the outer cylinder 14 so that they can exhibit stopper action with the bracket holding the inner cylinder 12 thereby to restrict the excessive displacement of the outer cylinder 14 in the axial direction X. The remaining constitutions and advantages are similar to those of the foregoing first embodiment, and therefore, descriptions thereof are omitted.

Industrial Applicability

The present invention can be applied to various vibration-isolating bushes such as a vibration-isolating bush to be assembled for use with the suspension mechanism of an automobile or a vibration-isolating bush of a cylindrical shape as an engine mount.

Figure 1:
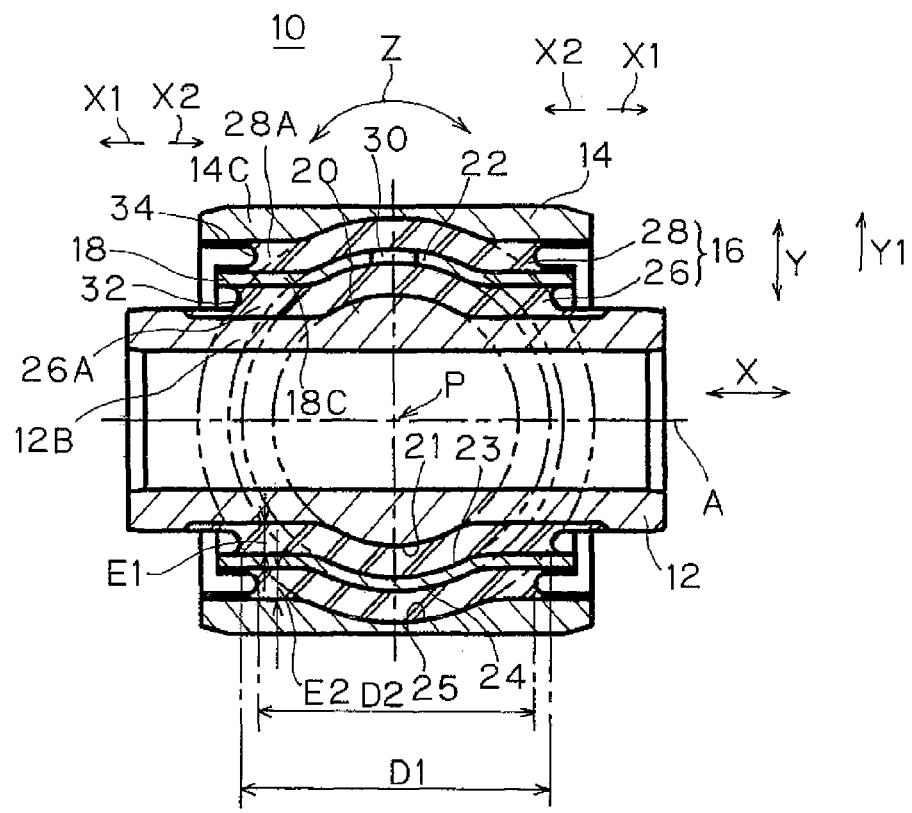
FIG. 1 is a sectional view (a sectional view of line I-I of FIG. 2) of a vibration-isolating bush according to a first embodiment.
Figure 2:
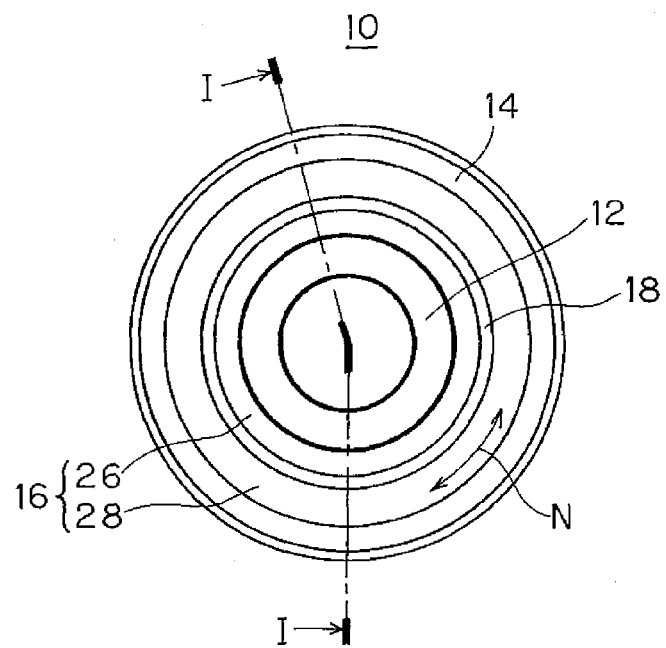
FIG. 2 is a side view of the vibration-isolating bush.
Figure 3:
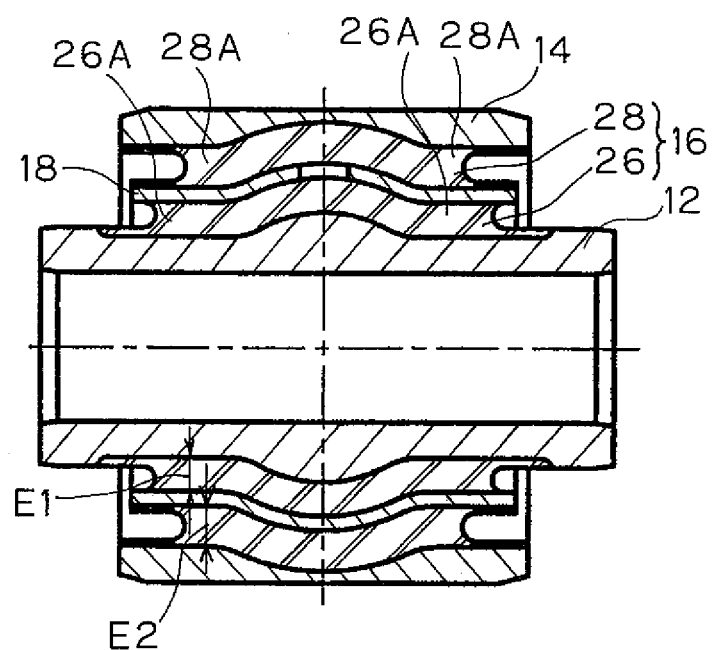
FIG. 3 is a sectional view of the vibration-isolating bush before drawn.
Figure 4:
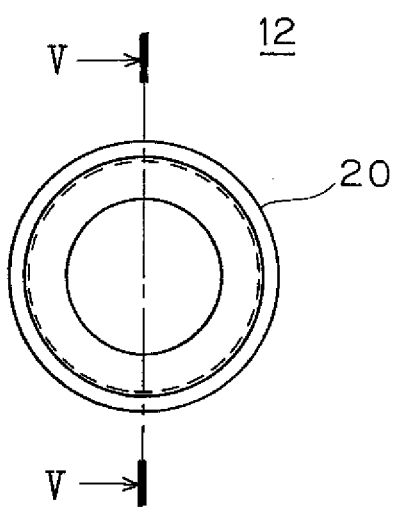
FIG. 4 is a side view of an inner cylinder of the vibration-isolating bush.
Figure 5:
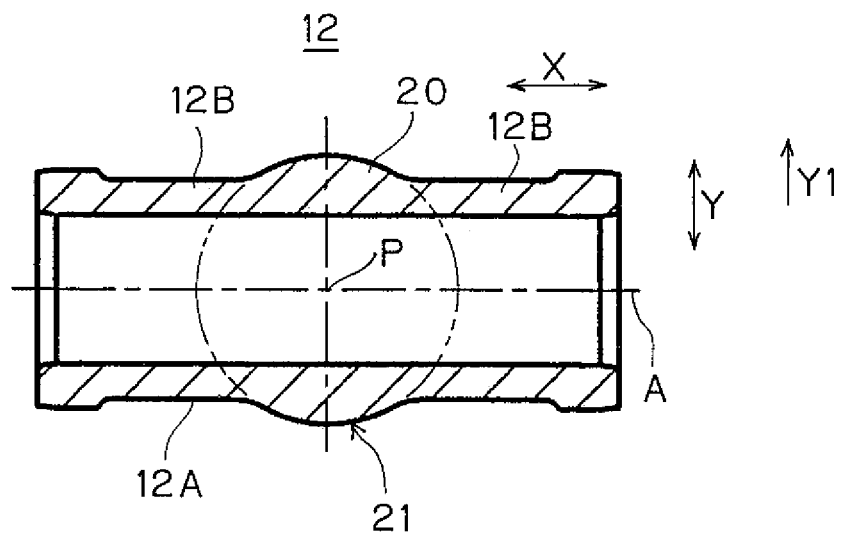
FIG. 5 is a sectional view of line V-V of FIG. 4.
Figure 6:
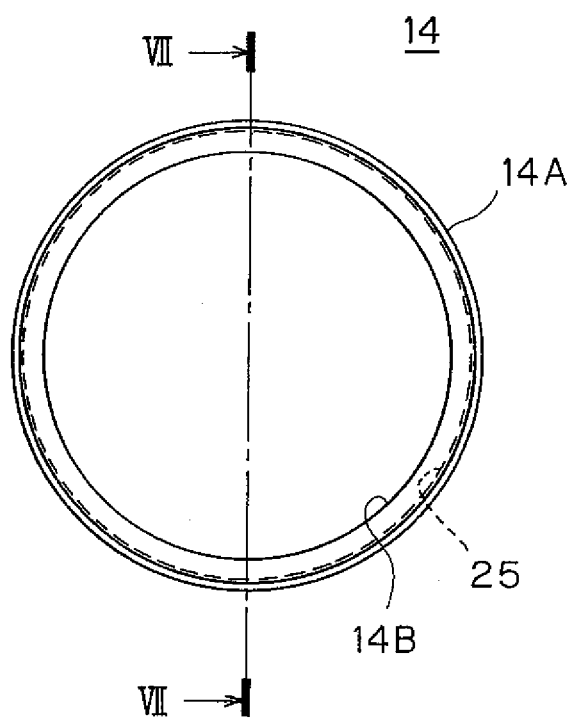
FIG. 6 is a side view of an outer cylinder of the vibration-isolating bush.
Figure 7:
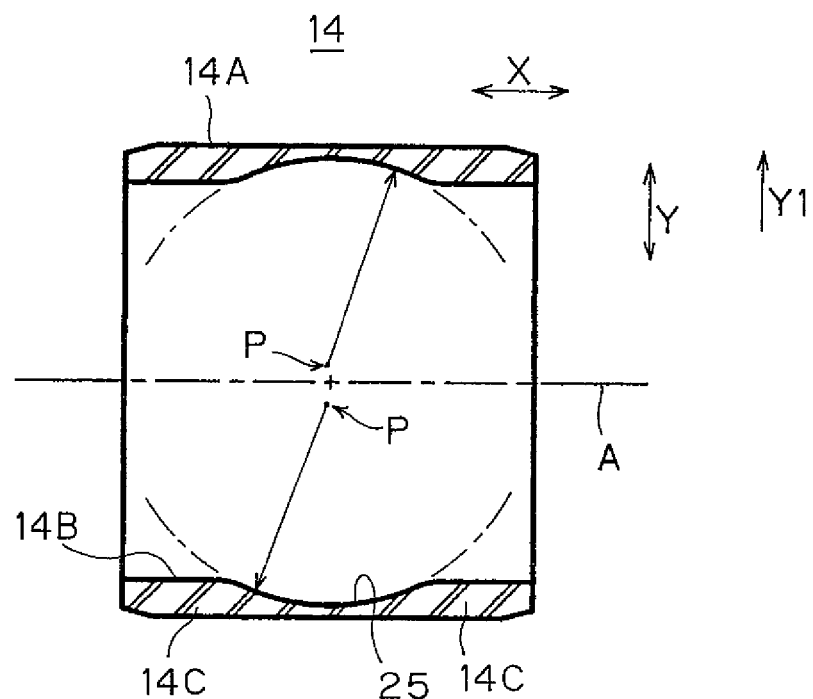
FIG. 7 is a sectional view of line VII-VII of FIG. 6.
Figure 8:
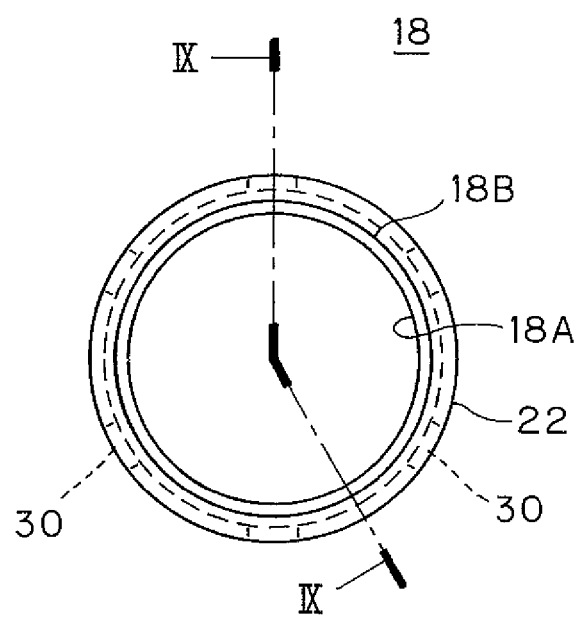
FIG. 8 is a side view of an intermediate cylinder of the vibration-isolating bush.
Figure 9:
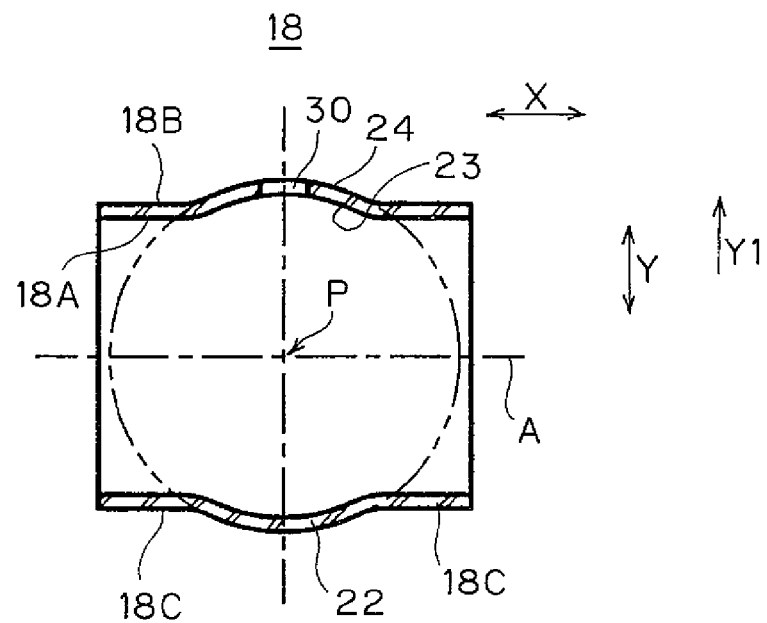
FIG. 9 is a sectional view of line IX-IX of FIG. 8.
Figure 10:
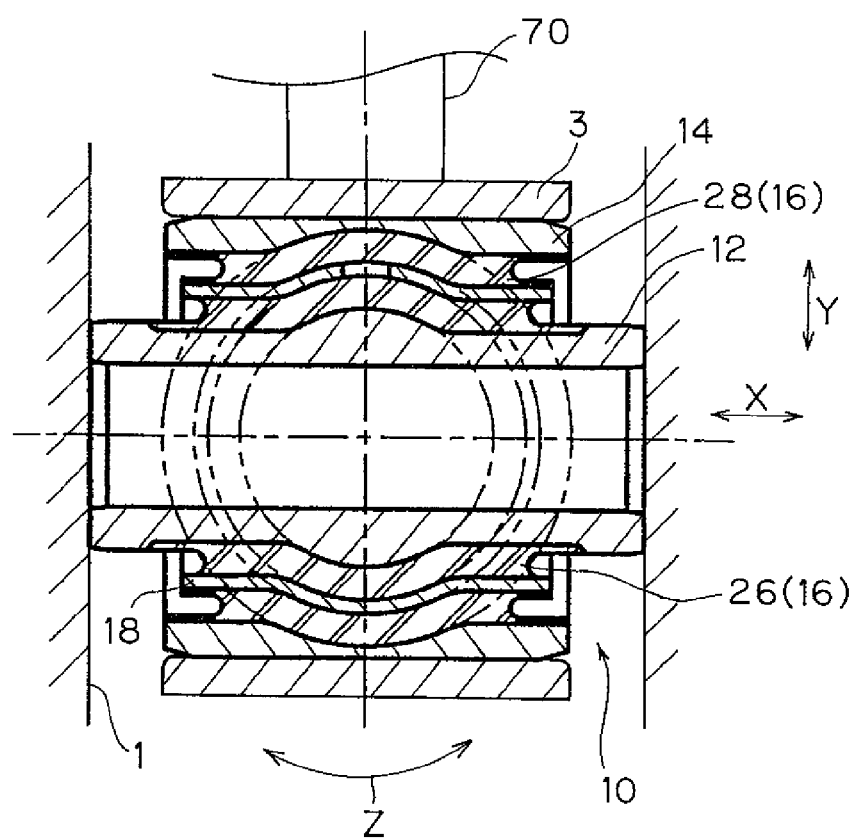
FIG. 10 is a sectional view showing the assembling state of the vibration-isolating bush.
Figure 11:
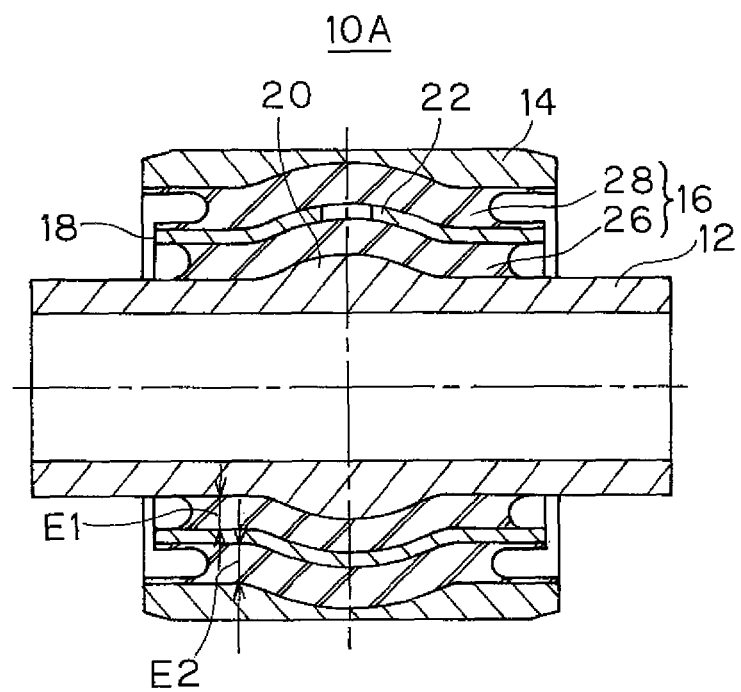
FIG. 11 is a sectional view of a vibration-isolating bush, before drawn, according to a second embodiment.
Figure 12:
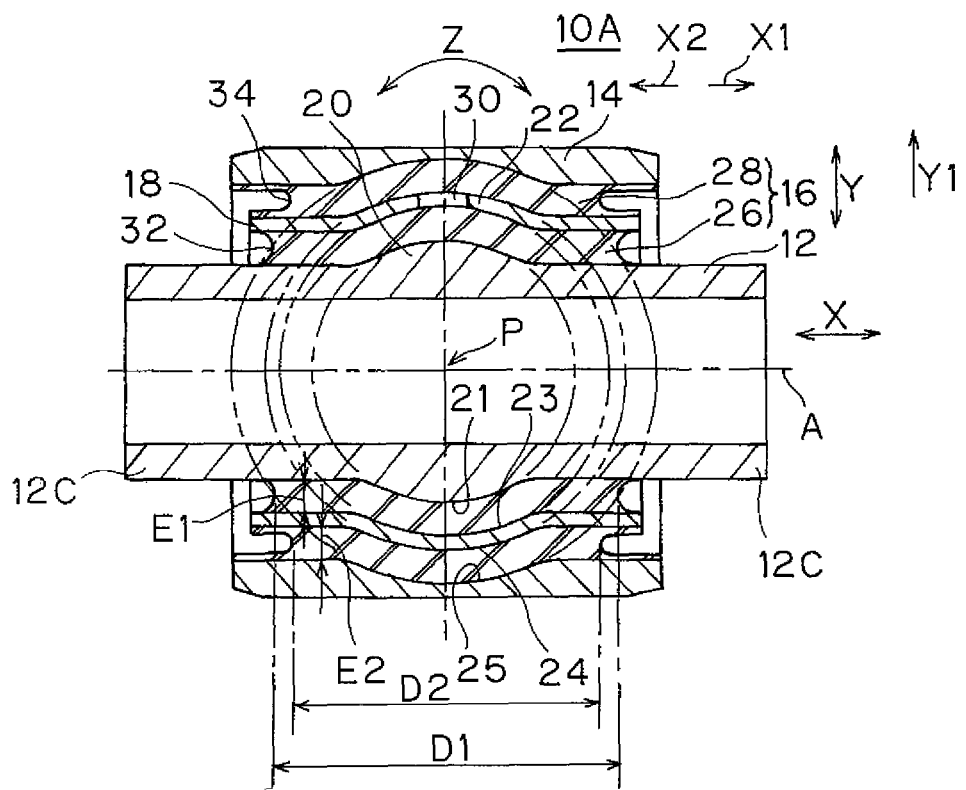
FIG. 12 is a sectional view of the vibration-isolating bush of the second embodiment after drawn.
Figure 13:
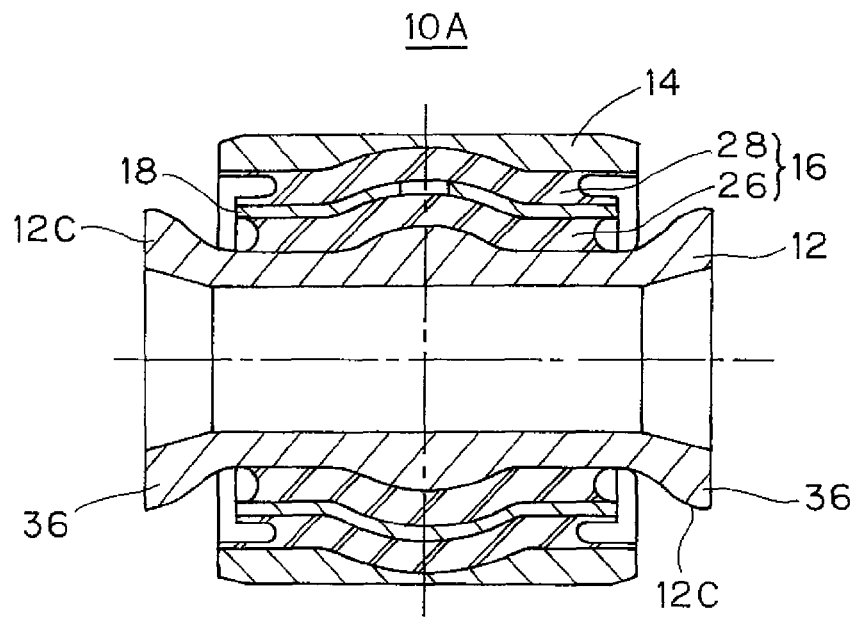
FIG. 13 is a sectional view of the vibration-isolating bush of the second embodiment after radially enlarged.
Figure 14:
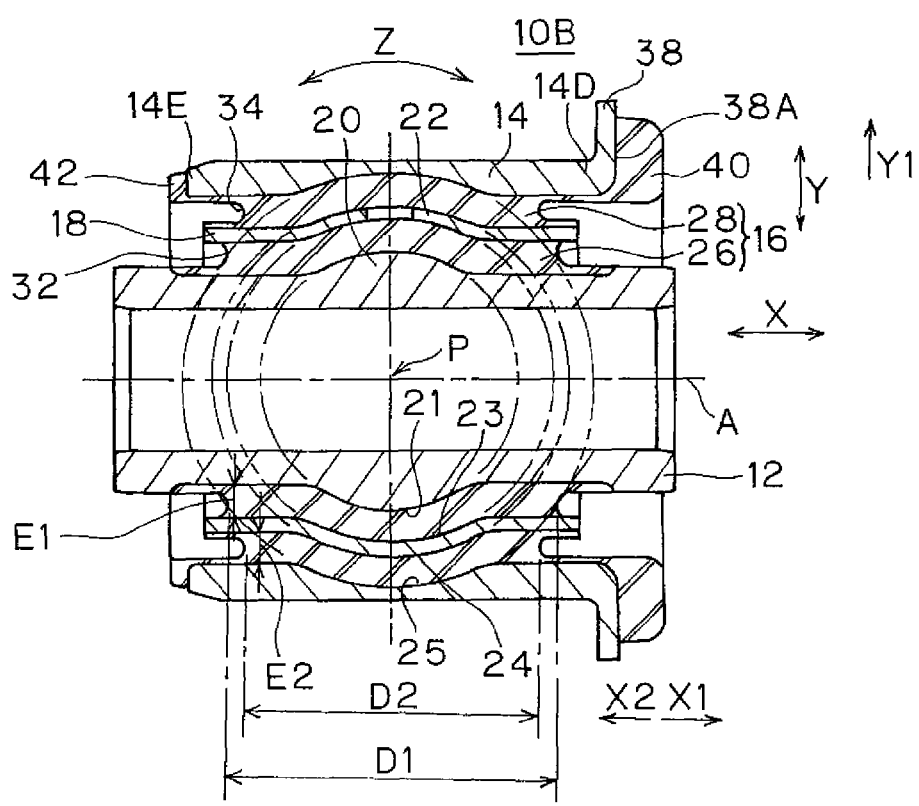
FIG. 14 is a sectional view of a vibration-isolating bush according to a third embodiment.
Figure 15:
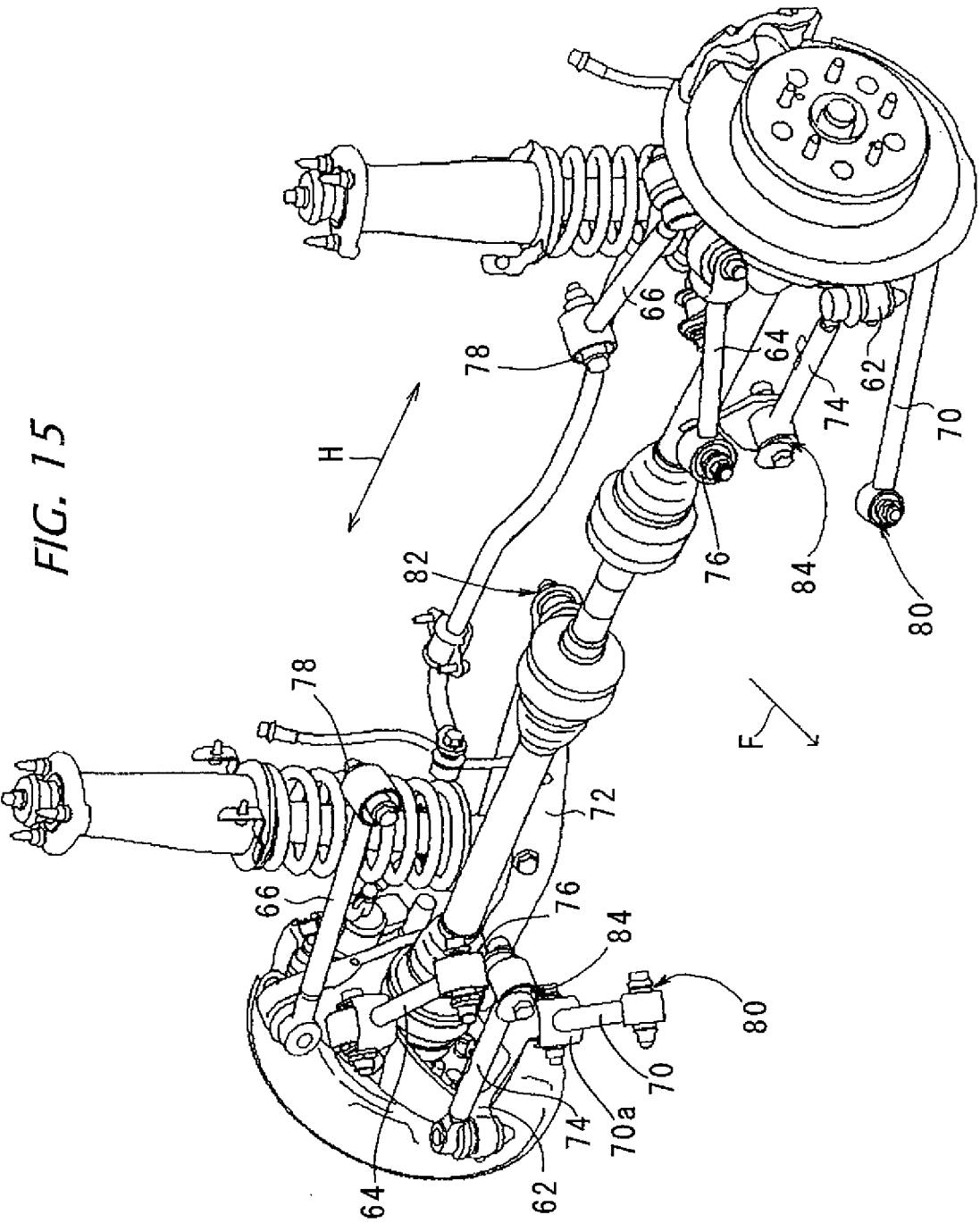
FIG. 15 is a perspective view of a suspension mechanism.
Figure 16:
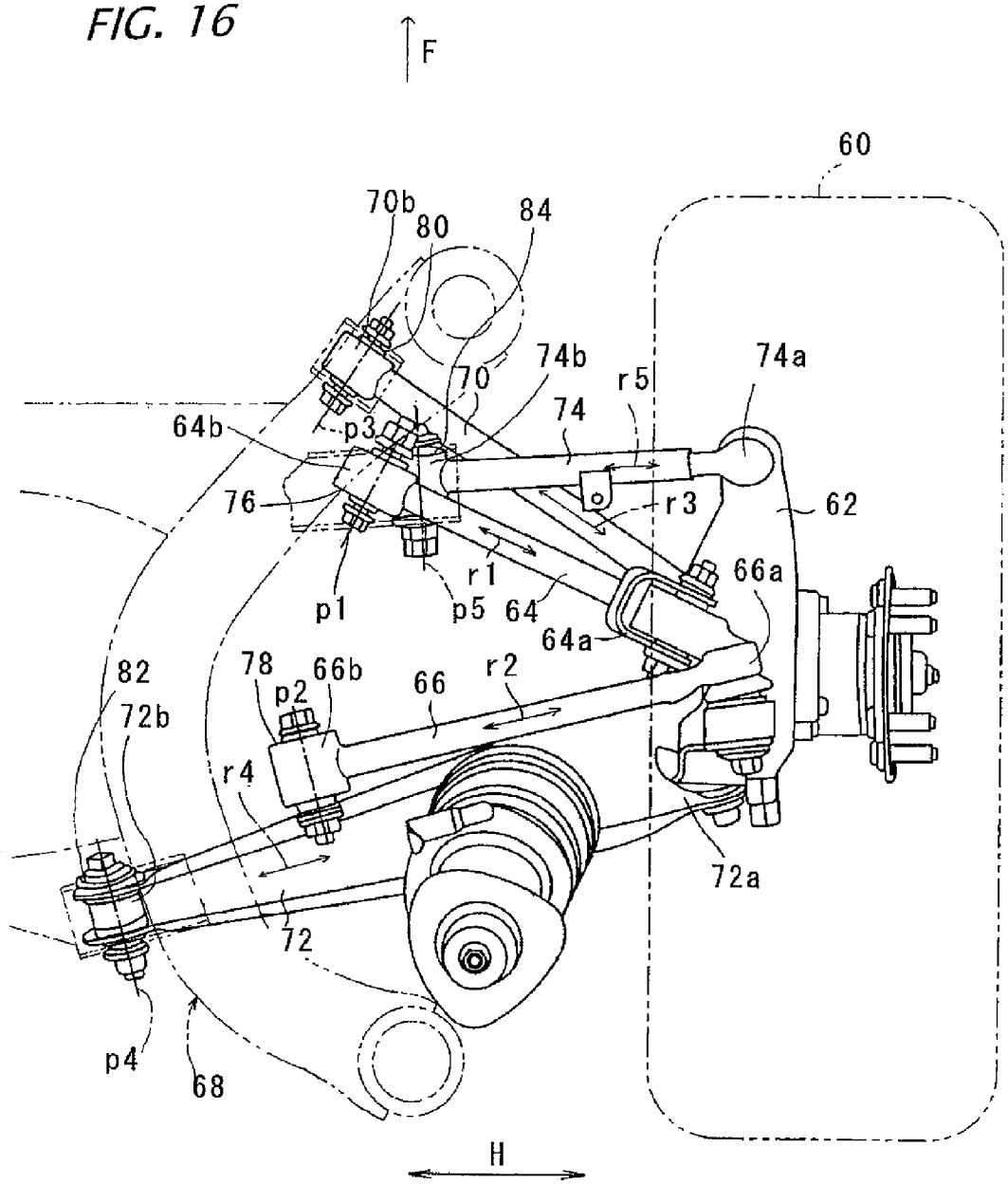
FIG. 16 is a top plan view of the suspension mechanism.

DESCRIPTION OF REFERENCE NUMERALS AND SIGNS 10, 10A and 10B . . . Vibration-Isolating Bush
12 . . . Inner Cylinder (Shaft Member), 12A . . . Outer Circumference, 12B . . . Inner Cylinder Portion on Axially Outer Side, and 12C . . . Axially End Portion
14 . . . Outer Cylinder, 14A . . . Outer Circumference, 14B . . . Inner Circumference, 14C . . . Outer Cylinder Portion on Axially Outer Side, and 14D, 14E . . . Axially End Portion
16 . . . Rubbery Elastic Member
18 . . . Intermediate Cylinder, 18A . . . Inner Circumference, 18B . . . Outer Circumference, and 18C . . . Intermediate Cylinder Portion of Axially Outer Side
20 . . . First Bulging Portion
21 . . . First Spherical Bulge
22 . . . Second Bulging Portion
23 . . . First Spherical Recess
24 . . . Second Spherical Bulge
25 . . . Second Spherical Recess
26 . . . Inner Elastic Portion, and 26A . . . End Portion
28 . . . Outer Elastic Portion, and 28A . . . End Portion
36 . . . Radially Enlarged Portion
40, 42 . . . Stopper Rubber Portion
D1 . . . Axial Size of Inner Elastic Portion, and D2 . . . Axial Size of Outer Elastic Portion
E1 . . . Thickness of Inner Elastic Portion in Transverse Direction, and E2 . . . Thickness of Outer Elastic Portion in Transverse Direction
X . . . Axial Direction, and X1 . . . Axially Outward
Y . . . Transverse Direction, and Y1 . . . Transversely Outward

The invention claimed is :

1. A vibration-isolating bush comprising:
a shaft member;
an outer cylinder enclosing the shaft member axially in parallel;
a rubbery elastic member interposed between the shaft member and the outer cylinder; and
an intermediate cylinder interposed between the shaft member and the outer cylinder axially in parallel, the intermediate cylinder surrounding an outer circumference of the shaft member, wherein
the shaft member has an axially central portion including a first bulging portion of a spherical zone shape bulging transversely outward,
the intermediate cylinder encloses the first bulging portion and has an axially central portion including a second bulging portion of a spherical zone shape bulging transversely outward, the second bulging portion having an inner circumference with a first spherical recess corresponding to a first spherical bulge of the first bulging portion, the outer cylinder encloses the second bulging portion and has a second spherical recess corresponding to a second spherical bulge of an outer circumference of the second bulging portion,
the rubbery elastic member includes an inner elastic portion adhered respectively to the outer circumference of the shaft member containing the first spherical bulge and to the inner circumference of the intermediate cylinder containing the first spherical recess, and an outer elastic portion adhered respectively to the outer circumference of the intermediate cylinder containing the second spherical bulge and to an inner circumference of the outer cylinder containing the second spherical recess, the outer elastic portion being compressed in the transverse direction and the inner elastic portion being uncompressed in the transverse direction, with the inner elastic portion having an axial size measured across a center of thickness of the inner elastic portion being larger than an axial size of the outer elastic portion measured across a center of thickness of the outer elastic portion, to bring a spring constant of the outer elastic portion in the transverse direction closer to a spring constant of the inner elastic portion in the transverse direction, said thickness of the inner elastic portion being measured from the inner elastic portion adhered to the outer circumference of the shaft member to the inner circumference of the intermediate cylinder and said thickness of the outer elastic portion being measured from the outer elastic portion adhered to the outer circumference of the intermediate cylinder to the inner circumference of the outer cylinder, and the inner elastic portion and the outer elastic portion each having annular hollow portions depressed in an axially inward direction to end at the axial end faces of the inner elastic portion and the outer elastic portion.

2. A vibration-isolating bush as set forth in claim 1, wherein the outer cylinder is drawn after vulcanization molding of the rubbery elastic member; and the outer elastic portion is thicker, before drawn, in the transverse direction than the inner elastic portion, and is as thick as the inner elastic portion after drawing.

3. A vibration-isolating bush as set forth in claim 1, wherein two end portions of the inner elastic portion are extended so axially outward as to connect a shaft member portion on an axially outer side of the first spherical bulge and an intermediate cylinder portion on an axially outer side of the first spherical recess; and two end portions of the outer elastic portion are extended so axially outward as to connect an intermediate cylinder portion on an axially outer side of the second spherical bulge and an outer cylinder portion on an axially outer side of the second spherical recess.

4. A vibration-isolating bush as set forth in claim 1, wherein an axially central portion of the outer cylinder has a straight cylinder shape having an outer circumference of a constant diameter in the axial direction.

5. A vibration-isolating bush as set forth in claim 1, wherein the shaft member has an inner cylinder of a cylindrical shape, and the inner cylinder has an axial end portion radially enlarged.

6. A vibration-isolating bush as set forth in claim 1, further comprising a stopper rubber portion disposed at an axially end portion of the outer cylinder.

7. A vibration-isolating bush as set forth in claim 1, wherein the spring constant of the inner elastic portion is substantially the same as the spring constant of the outer elastic portion in the transverse direction.

8. A vibration-isolating bush comprising:

a shaft member;

an outer cylinder enclosing the shaft member axially in parallel;

a rubbery elastic member interposed between the shaft member and the outer cylinder; and an intermediate cylinder interposed between the shaft member and the outer cylinder axially in parallel, the intermediate cylinder surrounding an outer circumference of the shaft member, wherein the shaft member has an axially central portion including a first bulging portion of a spherical zone shape bulging transversely outward, the intermediate cylinder encloses the first bulging portion and has an axially central portion including a second bulging portion of a spherical zone shape bulging transversely outward, the second bulging portion having an inner circumference with a first spherical recess corresponding to a first spherical bulge of the first bulging portion, the outer cylinder encloses the second bulging portion and has a second spherical recess corresponding to a second spherical bulge of an outer circumference of the second bulging portion, the rubbery elastic member includes an inner elastic portion adhered respectively to the outer circumference of the shaft member containing the first spherical bulge and to the inner circumference of the intermediate cylinder containing the first spherical recess, and an outer elastic portion adhered respectively to the outer circumference of the intermediate cylinder containing the second spherical bulge and to an inner circumference of the outer cylinder containing the second spherical recess, the inner elastic portion and the outer elastic portion each having annular hollow portions depressed in an axially inward direction to end at the axial end faces of the inner elastic portion and the outer elastic portion, with the axial end faces of the inner elastic portion being farther apart from each other than the axial end faces of the outer elastic portion, and the outer elastic portion being compressed in the transverse direction and the inner elastic portion being uncompressed in the transverse direction to bring a spring constant of the outer elastic portion in the transverse direction closer to a spring constant of the inner elastic portion in the transverse direction.

* * * * *